3,556,805
REDUCTION OF MIXING REQUIREMENTS FOR
YEAST LEAVENED BREAD DOUGH
James F. Conn, St. Louis, and Thomas P. Kichline,
Chesterfield, Mo., assignors to Monsanto Company,
St. Louis, Mo., a corporation of Delaware
No Drawing. Continuation-in-part of application Ser. No. 617,503, Feb. 21, 1967. This application Aug. 11, 1969, Ser. No. 856,243
Int. Cl. A21d 2/14, 2/16
U.S. Cl. 99—90                    17 Claims

ABSTRACT OF THE DISCLOSURE

Fumaric acid, fumaric acid salts thereof, and esters, having from 5 to about 9 carbon atoms reduce the mixing requirements for yeast leavened bread dough produced from wheat flour. Dibasic calcium fumarate is preferred. Bread additives containing fumaric acid, salts or esters thereof and ammonium salts of inorganic acids enable the production of bread having an improved shelf life. Wheat flour compositions containing these fumaric acids, salts thereof or esters thereof produce bread doughs having a reduced mixing requirement.

---

This application is a continuation-in-part of copending application Ser. No. 617,503, filed Feb. 21, 1967, now abandoned.

This invention relates, in general, to yeast-leavened bread containing wheat flour. More particularly, it relates to improvements in the production of bread, novel bread additives and flour compositions containing the novel bread additives.

Although various "breads" are made, bread, as used herein, refers to yeast-leavened bread produced with wheat flour. One of the major problems which has heretofore faced the manufacturers of bread is the high mixing requirements necessary to produce a good quality bread. In the continuous process for producing bread, a liquid brew is prepared from some of the conventional bread-making ingredients including yeast, yeast food, sugar, wheat flour and other optional bread-making ingredients. A major portion of the fermentation (which aided in developing the cell structure in the older "conventional" process for bread) occurs in the brew. This "development" is achieved in the continuous production of bread by high speed mixers. These mixers "develop" the bread after the brew is mixed together with the other bread-making ingredients which include shortening, emulsifiers, oxidants and the rest of the wheat flour. To achieve a good quality bread, it is usually necessary, when flour produced from certain types of wheat are used, to either mix the ingredients for prolonged periods of time or to supply extremely high energy requirements in order to develop good quality bread. In many continuous processes, the mixing step is the bottleneck.

In the batch or conventional process, several ingredients such as water, yeast, yeast food, salt, sugar, malt, milk solids, shortening, buffering agents and oxidants are combined with the flour to thereby form a dough. Fermentation starts during initial mixing and continues up to a relatively short time before the bread is completely baked. In many instances the "sponge and dough" method is used commercially. In this method, part of the ingredients are mixed together to form a "sponge" and after about 3 to 5 hours, the remaining flour, milk solids, shortening, sugar and other ingredients are added. A degree of dough development occurs at this stage and also mixing requirements are relatively high because of the viscous mixture. A reduction in mixing requirement would be beneficial in many instances because the mixing step is the bottleneck in many commercial bakeries using the batch method. Also, if the mixing step is not the bottleneck, the reduced mixing requirement enables a sizeable decrease in power input thus reducing power costs.

An additional problem with all bread, regardless of the process used for producing it, is "shelf-life" or the tendency of the bread to lose its softness over a period of time.

Various additives have been used to overcome the problems associated with high mixing requirements and shelf-life. None of these additives are believed to be completely satisfactory because they introduce other problems into the production of bread. For example, glutathione and cysteine reportedly reduce the mixing requirements of bread; however, if they are used in amounts required to effectively reduce mixing requirements of bread dough, additional oxidants such as potassium iodate and potassium bromate must be used at or above the maximum level established by the Federal Drug Administration in order to achieve good quality bread and can cause bad flavors. Certain emulsifiers such as the mono-, diglycerides have been used to improve shelf-life. The compounds, however, are relatively expensive and are difficult to prepare. It is believed, therefore, a novel, relatively inexpensive, bread additive which not only reduces mixing requirements in the continuous production of yeast-leavened bread but also improves the quality of the bread produced and which is suitable yeast food would be a significant advancement in the art.

In accordance with this invention, it has been discovered that compositions comprising fumaric acid, salts thereof or an ester of fumaric acid having from 5 to 9 carbon atoms reduce the mixing requirements in the development of bread. Bread additives containing such fumaric compounds and certain ammonium salts have been found to improve the shelf-life of the bread.

By utilizing the aforementioned fumaric compounds, the mixing time for preparing yeast-leavened bread is reduced. Additionally, if a bread additive, i.e., a fumaric compound combined with certain ammonium salts, is used for preparing bread, mixing time is reduced and bread shelf-life and softness improved. Also, when certain salts of fumaric acid are used, mineral enrichment is provided. Finally, fumaric compounds may be used so as not to affect the yeast fermentation.

In addition to fumaric acid, monobasic or dibasic salts thereof may be employed in accordance with this invention. Such salts include alkali metal, alkaline earth metal, or ammonium salts, for example, monobasic sodium fumarate, dibasic calcium fumarate, dibasic potassium fumarate, monobasic magnesium fumarate, monobasic ammonium fumarate, monobasic calcium fumarate. Dibasic calcium fumarate is preferred. Additionally, esters of fumaric acid having 5-9 carbon atoms may also be employed and include methyl fumarate, monobutyl fumarate, monoethyl fumarate trans-1-methyl-2-ethyl ethylene di-carboxylate, and trans-diethyl-1,2-ethylene dicarboxylate. Preferred esters include monomethyl fumarate, monoethyl fumarate and monopropyl fumarate.

Although various methods can be used to incorporate fumaric acid, salts thereof, and esters thereof into bread compositions prior to mixing, it is preferred, particularly in the continuous process, to incorporate them as part of a bread additive or a bread supplement. One of the preferred embodiments of the subject invention is to provide a bread additive which contains one of the fumaric compounds and certain ammonium salts. The bread additive provides a source of yeast food, reduces mixing requirements and improves shelf-life. Heretofore, "yeast food compositions" were generally added to both conventional and continuous bread making processes. These "yeast food compositions" generally contain various ammonium and calcium salts, such as ammonium sulfate, calcium sulfate, dicalcium phosphate, monocalcium phosphate, diammonium phosphate, calcium carbonate and ammonium chloride. Other ingredients such as sodium chloride, oxidants, and fillers are added. Also, in most instances, by incorporating into a bread additive, at least some of these fumaric compounds can be added to the bread making process prior to mixing, in a convenient manner and which additive will reduce mixing requirements, provide a source of yeast food and improve shelf-life of the bread. The bread additives of this invention contain ammonium compounds which provide nitrogen to the yeast cells and at least one of the foregoing useful fumaric compounds. The useful ammonium compounds are salts of the inorganic acids such as ammonium sulfate, ammonium phosphate and ammonium chloride. Thus, the composition comprising the fumaric compounds and the amonium salts, one of the preferred embodiments of this invention, as a bread additive offers a convenient method of incorporating these compounds into the bread process and thereby achieving the benficial results, reducing the mixing time of dough, providing a yeast food and improving shelf-life of the resulting bread. Normally, the mono-ammonium salts are used and of these, mono-ammonium orthophosphate is preferred. Fumaric acid, esters and salts thereof can be used alone and achieve the reduced mixing time, however, no appreciable improvement in shelf-life of the bread results.

In the formulation of bread additives utilizing the compounds of this invention, it is generally preferred to incorporate a flow conditioner or filler to enable the compositions to remain free flowing. The most common fillers presently employed in yeast food compositions are flour and starch. Although these can be used satisfactorily in the practice of this invention, it is generally preferred to use dicalcium phosphate, calcium sulfate or tricalcium phosphate as a flow conditioner and thereby provide a source of calcium to the bread which is recognized as a valuable nutrient in bread.

It is also preferred in some instances to use monocalcium orthophosphate (MCP) along with fumaric acid or salts or esters thereof, compounds to provide a buffering action and an additional source of calcium. The amounts and proportions of monocalcium orthophosphate that will be employed will be dependent upon several factors such as the particular ingredients that are in the bread formulation. For example, if relatively high levels of nonfat dry milk, such as above about 3% by weight are used, the levels of the ammonium and calcium salts will be relatively high to achieve the proper pH in the system. Additionally, if fumaric acid is used, lower levels of the ammonium and calcium inorganic salts can be used to achieve desired pH levels than if the ammonium, alkaline earth metal or alkali metal salts of this acid is employed. In most instances, however, the bread additive will contain from about 3 to about 50% of the fumaric compounds; from about 3% to about 50% of the ammonium salts and the remainder of the composition will contain varying levels of monocalcium orthophosphate and the inert filler or flow conditioner to yield a composition which will yield a pH in baked bread of from about 5.1 to about 5.7 when a bread is produced from the following formulation:

| | Parts |
|---|---|
| Flour | 1000 |
| Yeast | 30 |
| Water | 650 |
| Sugar | 20 |
| Salt | 20 |
| Nonfat dry milk solids | 20 |
| Shortening | 30 |
| Potassium bromate | 0.060 |
| Potassium iodate | 0.015 |
| Bread additive (composition of this invention) | 5 |

An additional method of characterizing suitable formulations is by reference to the neutralizing value of the formulation. The neutralizing value of yeast food compositions suitable in the practice of this invention has a neutralizing value greater than about 50. Neutralizing value is the parts by weight of the composition required to neutralize 100 parts of sodium bicarbonate ($NaHCO_3$) in an aqueous solution. The bread additive of this invention can contain an oxidant, such as potassium bromate, potassium iodate, calcium iodate, calcium bromate and calcium peroxide, in addition to the beforementioned ammonium and calcium salts. Typical formulations, which are preferred in the practice of this invention contain an ammonium compound selected from the ammonium sulfates, ammonium chlorides and ammonium phosphates; the useful unsaturated compounds and can contain, as desired, the following: a flow conditioner selected from the group consisting of flour, starch, dicalcium phosphate, tricalcium phosphate and calcium sulfate; monocalcium orthophosphate; salt; and an oxidant selected from the group consisting of potassium bromate, calcium bromate, potassium iodate, calcium iodate and calcium peroxide. The ranges by weight percentages of the ingredients in the bread additives are given in Table A.

TABLE A

| Ingredient: | Range (weight percent in yeast food composition) |
|---|---|
| Ammonium compound | 3 to 25 |
| Fumaric compound | 3 to 35 |
| Monocalcium orthophosphate | 0 to 40 |
| Salt (NaCl) | 0 to 40 |
| Oxidant | 0 to 3 |
| Flow conditioner | 0 to 50 |

While the amount of the ingredients in the yeast food composition can vary within the ranges given, it is preferred to formulate bread additives, which, when used in bread making in amounts of from about 0.5% to about 2.5% based upon the weight of flour in the bread will result in amounts of oxidants in the bread of from about 0.0025 to about 0.0075% by weight, amounts of the ammonium compounds in the bread from about 0.1 to about 0.25% by weight and amounts of the unsaturated compounds in the bread of from about 5 to about 30 micromoles per gram of flour, and in some cases up to 50 micromoles per gram of flour. In most instances, the weight ratio of the useful fumaric compounds to the ammonium compounds will be from about 1:20 to about 20:1, respectively, with weight ratios of from about 1:10 to about 10:1, respectively, being especially preferred.

Another suitable method of incorporating the unsaturated compounds of this invention into bread is by preparing a flour mixture containing them. As was previously mentioned, various types of flour have different mixing characteristics; therefore, if a baker is using more than one type of flour, one method to achieve optimum benefits of this invention is to add the appropriate amount of a fumaric compound or the yeast food composition to the flour. If a baker used varying types of flour and each contained the amount of additive required to reduce mixing time, no problem would exist with varying quality of flour as far as mixing time or mixing requirement is concerned.

In most instances, however, with most flours, the amount of the fumaric compound incorporated into the bread is relatively low, that is, less than about 1.0% by weight based upon the flour that is used. Since no adverse effects result from the use of more of the fumaric compounds than is required to give a significant reduction of mixing time, the higher levels can be used satisfactorily. The baker, therefore, can incorporate the compositions in the amount required to significantly reduce mixing time of the most difficult flour without adverse effects upon the quality of the bread.

When utilizing salts of fumaric acid, such salts may be added alone, in combination with a flow conditioner (hereinbefore mentioned) or as bread supplements, i.e., compositions containing fumaric acid and an appropriate base so that when utilized in bread making processes, the fumaric salts are formed in situ.

Generally, in addition to fumaric acid, the bread supplements contain as a base sodium hydroxide, calcium hydroxide, potassium hydroxide or lithium hydroxide. A preferred base is calcium hydroxide. These supplements may also contain a flow conditioner (hereinbefore mentioned); a preferred flow conditioner is starch.

Generally, the fumaric acid is used in an amount of from about 25% by weight to about 60% by weight, preferably from about 35% by weight to about 45% by weight, the base is used in an amount of from about 20% by weight to about 40% by weight and the flow conditioner is used in an amount from about 15% by weight to about 55% by weight, preferably from about 25% by weight to about 40% by weight, all concentrations being based on the total weight of the bread supplement. The neutralizing value of these bread supplements is from about 0 to 36, preferably from about 0 to 25.

The bread supplements of this invention are used in an amount of from about 0.02% by weight to about 3% by weight, preferably from about 0.4% by weight to about 0.7% by weight, based on the weight of the flour. They are prepared by admixing the ingredients.

As previously mentioned, the amount of the unsaturated compounds necessary to achieve a significant reduction in mixing time of the dough is relatively low, that is, amounts as low as about 0.005% based upon the weight of the flour yield a measurable reduction in mixing requirements. In most instances, however, larger amounts will be used, such as from about 0.05% to about 0.8% although amounts up to about 1.0% by weight based upon the flour can be used. In some instances, the amount will be from about 0.05% to about 0.3%.

When the salts or esters are employed, they are used in equivalent molar amounts, for example, when monocalcium fumarate is employed in amounts as low as about 0.007 based upon the weight of flour. In most instances, however, larger amounts will be used, such as from about 0.07% to about 0.8% although amounts up to about 1.4% by weight based upon the flour may be used.

Amounts of the ammonium salts of inorganic acids along with unsaturated compounds that have been found to yield improved shelf-life generally range from about 0.005% by weight to about 0.5% by weight, based upon the flour used. The compositions of this invention containing the ammonium salts and the fumaric compounds will usually be incorporated in the flour in amounts so as to yield from about 5 to about 30, and in some instances 50 microgram moles of the fumaric compounds per gram of flour and from about 5 to about 35 microgram moles of the ammonium compounds per gram of flour.

The fumaric compounds may be advantageously used so as not to interfere with yeast fermentation rate by effecting the pH. For example, in the continuous process for making bread, the starting pH of the brew is from about 4 to about 6, preferably from about 4.7 to about 5.7 at about 30° C. The final pH at about 30° C. of the brew (i.e., after fermentation is substantially complete) is from about 3 to about 5.5. Likewise, in the sponge and dough method, the starting pH of the sponge is from about 5 to about 6, preferably from about 5.0 to about 5.9. The final pH of the dough is from about 4 to about 6, preferably from about 4.8 to about 5.7. All pH's at about 30° C.

To more fully illustrate the subject invention, the following detailed examples are presented. All parts, percentages and proportions are by weight unless otherwise indicated.

EXAMPLE I

The Brabender Farinograph is used by the baking industry to predict the mixing requirement for the production of bread utilizing a wheat flour. Certain measurements on a sample of a flour and water mixture correlates well with the actual mixing requirements in the production of bread; also any additive which is used with the flour and water mixture which lower the mixing requirement as tested by the Brabender Farinograph will also lower the mixing requirements. They are the time required to reach maximum resistance (peak time) and the time required for the resistance to reach a peak and then drop 30 units on the Farinograph (time to breakdown).

Samples of flour and water and with various additives are tested. The amount of additives used in each case is 10 micromoles per gram of flour. The procedure used is Method No. 54–21 Cereal Laboratories Method 7th ed. American Association of Cereal Chemists, St. Paul, Minn., modified, however, by raising the r.p.m. of the mixer from 63 to 104 and conducting the test at 40° C. instead of 30° C. The higher temperature corresponds more closely with continuous process doughs. A fumaric acid sample is prepared and tested for "peak time" and for "time to breakdown." In each instance, the flour used is produced from a hard red winter wheat having a protein content of 11.8%, ash content of 0.41% and moisture content of 13.06%. Table 1 gives the results of these tests.

TABLE I

| Sample | Additive | Peak time, minutes | Time to breakdown, minutes |
| --- | --- | --- | --- |
| 1 | Control (no additive) | 10 | 11.8 |
| 2 | Fumaric acid | 4.9 | 5.6 |

The results of the above tests indicate that fumaric acid is effective in reducing mixing time at low levels of usage.

Substantially similar results are obtained by substituting substantially molar equivalent amounts of dibasic sodium fumarate, dibasic potassium fumarate, methyl fumarate and ethyl fumarate for the fumaric acid, of this example.

EXAMPLE II

Using the procedure in Example I, fumaric acid is tested to determine its effect upon the mixing requirement of flour. All conditions were the same as in Example I except varying quantities of additives are used. Table 2 gives the results of these tests.

TABLE 2

| Sample | Additive | Amount used [1] | Peak time, minutes | Time to breakdown, minutes |
| --- | --- | --- | --- | --- |
| 1 | None | | 10.0 | 11.8 |
| 2 | Fumaric acid | .116 | 4.9 | 5.6 |
| 3 | do | .33 | 3.6 | 4.0 |

[1] Parts/100 parts of flour.

EXAMPLE III

Since the mixing requirement is believed to be dependent to a large extent upon the protein contained within the gluten in the wheat flour, using a procedure similar to that in Example I only substituting gluten for flour offers a method by which reductions in mixing requirements can be more easily demonstrated because the mixing time for a gluten water mixture is generally about 1½ times longer than for a flour-water mixture.

To about 230 parts of gluten, about 1.01 parts of fumaric acid are added. To this mixture about 290 parts of water are added. A peak time of about 7.5 minutes is observed as compared with a peak time of about 16.5 minutes on a similar mixture without the fumaric acid. The time to breakdown in the mixture containing fumaric acid is about 16.5 minutes compared to about 38.5 minutes for the material without the fumaric acid.

A similar mixture in which the amount of fumaric acid is reduced to about 0.3 part has a peak time of about 10.5 minutes and a time to breakdown of about 30 minutes, indicating that only relatively small quantities of the unsaturated compounds useful in this invention are required to produce a measurable effect upon mixing requirements.

Other mixtures of gluten with other additives are tested in a similar manner. Table 3 below gives the results of these tests.

TABLE 3

| Sample | Additive | Amount used [1] | Peak time, minutes | Time to breakdown, minutes |
|---|---|---|---|---|
| 1 | None | | 16.5 | 38.5 |
| 2 | Diethyl fumarate | 0.65 | 12.5 | 24 |
| 3 | Fumaric acid | 0.44 | 7.5 | 16.5 |

[1] Parts/100 parts gluten.

EXAMPLE IV

The effect of various additives as yeast foods upon bread quality and upon mixing requirements are tested using the Do Maker Laboratory Continuous Mix Baking Procedure with four modifications. (1) Yeast foods are varied from test to test. (2) 2% nonfat dry milk is used in all tests. (3) 20% of the flour is added to the broth. (4) 3.25% of a shortening blend containing 84% lard, 8.3% hydrogenated cotton seed oil flakes and 7.7% monoglyceride emulsifier is used. Throughput is varied in several tests to demonstrate the effect of additives on equipment capacity. R.p.m. of the mixer is held constant throughout a test but tests at different r.p.m.'s determine the effect of different shear rates on the throughput.

Using a mixer speed of about 140 r.p.m. a dough is prepared using a commercial yeast food containing 50% monocalcium phosphates, 7% ammonium sulfate, 20% sodium chloride, 0.10% potassium iodate, 0.15% potassium bromate and 22.75% starch. The level of yeast food is about 0.75% based upon the weight of the flour. The optimum throughput is determined to be about 1.70 lbs. per minute. When a yeast food of this invention (containing about 25% fumaric acid, about 26% monocalcium phosphate, about 10% ammonium phosphate, about 8% sodium chloride and about 31% starch at a 0.4% level based upon flour) is used, the throughput is increased to 3.23 lbs. per minute. At a mixer speed of about 170 r.p.m. the commercial yeast fod gives a throughput of about 2.90 lbs. per minute. The yeast food of this invention gives a throughput of about 3.76 lbs. per minute at a mixer speed of 170 r.p.m.

The bread produced using a mixer speed of 140 r.p.m. is baked and bread scores are run on samples of the bread.

Table 4 lists the bread scores:

TABLE 4

| | Conventional yeast food | Bread additive of this invention |
|---|---|---|
| Loaf volume | 8 | 9 |
| Grain | 18 | 19 |
| Texture | 19 | 19 |
| Crumb color | 9 | 9 |
| Aroma and taste | 9 | 9 |
| Softness | 12 | 14 |
| Crust color | 2 | 2 |
| Break and shred | 3 | 3 |
| Total score | 89 | 93 |
| Compressibility, percent (72 hrs. after baking) | 57 | 64 |

Additionally, at a constant throughput of 2.90 lbs./minute using the commercial yeast food a mixer r.p.m. of 184 must be used to obtain a satisfactory bread quality while use of the compositions of this invention enable a mixer r.p.m. of as low as 145 to obtain equal quality bread which has an improved shelflife.

The results of the above tests indicate that production rate can be nearly doubled at a given mixer r.p.m., that is, a throughput of about 1.7 lbs. per minute is achieved using the present commercial yeast foods while a production rate of 3.23 lbs. per minute is achieved using the composition of this invention. Furthermore, it is shown that the quality of the bread is higher than that produced from the present yeast foods. For example, on grain, volume and softness the bread produced containing the compositions of this invention scores higher. In addition, the crumb compressibility at 72 hours after baking, indicates that the shelf-life of the bread containing the yeast foods of this invention are considerably improved over the bread containing the presently used commercial yeast food.

EXAMPLE V

To determine in the laboratory whether an additive has an effect upon dough and bread characteristics in a batch bread process, the American Association Cereal Chemists Method No. 10–11 can be used. See Cereal Laboratory Methods, A.A.C.C., St. Paul, Minn., 7th ed. (1962). In tests on various additives, this method is used with 3 modifications. The amount of sugar is increased from 5 to 7%, 3% nonfat dry milk is used and a 50/50 blend of two commercial yeast foods is used in the control doughs (Sample 1) instead of the yeast foods given in A.A.C.C. Method No. 10–11. This yeast food is omitted from the dough to which the additives of this invention are used (Sample 2). The blend of commercial yeast foods used in Sample 1 has the following composition: 25% monocalcium phosphate, 35% ammonium sulfate, 0.05% potassium iodate, 0.20% potassium bromate, 31.4% starch, 22.5% NaCl, 12.5% calcium sulfate and 4.85% ammonium chloride.

The bread additive of this invention (used in Sample 2) contains about 26% monocalcium phosphate, about 26% monoammonium phosphate and about 16.7% fumaric acid, about 23.3% starch and about 8% salt. The yeast food of this invention is used at a level of about 0.6% based upon the flour used in the formulation. The mixer speed used was 198 r.p.m. When the commercial yeast food was used, the mixing time for optimum development was 12 minutes as compared to 6 minutes in the bread containing the yeast food of this invention. The quality of the bread in both instances was comparable as the bread scores for each bread as shown in the following table indicates.

TABLE 5

| | Sample 1 | Sample 2 |
|---|---|---|
| Loaf volume | 9 | 8 |
| Grain | 17 | 17 |
| Texture | 17 | 17 |
| Crumb color | 9 | 9 |
| Aroma and taste | 9 | 9 |
| Softness | 14 | 14 |
| Crust color | 2 | 2 |
| Break and shred | 3 | 3 |
| Total score | 89 | 88 |

EXAMPLE VI

In this example, bread is made using the continuous process with a two-stage brew preparation. In the first stage about 400 parts of flour, about 30 parts of yeast, about 10 parts of a bread additive, and about 650 parts of water are added to an agitated, heated vessel. The bread additive contained about 10.0% by weight of fumaric acid, about 28% by weight of monocalcium orthophosphate, about 6.5% by weight monoammonium phosphate, about 35.5% salt (sodium chloride) and about 20% dicalcium orthophosphate dihydrate. After the brew is heated to about 85° F. to about 90° F. for about 45 minutes, an additional 100 parts of flour, about 20 parts of sugar, about 20 parts of salt, about 30 parts of nonfat dry milk solids and 1 part of mold inhibitor are added. After the latter ingredients are added, the brew is agitated and held at about 85° F. to 90° F. for about an additional 105 minutes after which the brew is transferred to an incorporator where about 500 parts of flour, about 30 parts of shortening, about 40 parts of sugar, about 0.06 part of potassium bromate and about 0.015 part of potassium iodate are added and mixed to form a premixed dough. After a dough is formed, it is transferred to a high speed mixer, where the dough is developed by a high degree of mixing for about 40 seconds. After the dough is developed in the high speed mixer, it is divided and panned. The bread is proofed for about 60 minutes in a chamber wherein the temperature is controlled at about 100° F. at 95% relative humidity. After the proofing time, the bread is placed in the oven and allowed to bake for about 18 minutes at about 450° F. By use of the yeast food, the production rate is about doubled over the rate achieved with commercial yeast foods.

The bread has good volume, and excellent grain, texture, crumb color and taste characteristics and is suitable for commercial sale. Furthermore, as shown by crumb compressibility, it has an improved shelf-life. Other comparable bread can be produced in the same manner as described above by replacing monoammonium orthophosphate with substantially molecular equivalent amounts of diammonium phosphate, ammonium sulfate, or ammonium chloride. For example, about equal parts by weight of ammonium sulfate can be substitued for monoammonium orthophosphate and the resulting bread has good volume, grain, texture, crumb color, taste characteristics and improved shelf-life.

EXAMPLE VII

In this example, bread is produced by the conventional method. About 650 parts of flour produced from hard red winter wheat, about 25 parts of yeast, about 10 parts of a bread additive, and about 390 parts of water are mixed together to form a sponge. The bread additive contains about 25% by weight of monoammonium phosphate, about 25% by weight of monocalcium phosphate, about 15% by weight of fumaric acid, 0.62% by weight of potassium bromate, 0.15% by weight of potassium iodate, about 20% by weight of salt and about 14% by weight of dicalcium phosphate as a flow conditioner. The sponge is allowed to ferment for about 3½ hours after which about 350 parts of flour, about 250 parts of water, about 30 parts of nonfat dry milk solids, about 30 parts of shortening, about 20 parts of sugar, about 20 parts of salt and about 1.5 parts of mold inhibitor are blended together with the sponge in a relatively low speed mixer for about 3.0 to about 5.0 minutes to form a "developed" dough. The dough is allowed to relax for about 30 minutes then is divided into loaves, rounded, rested for about 15 minutes, molded, placed into pans, allowed to proof for about 60 minutes, and then baked for about 25 minutes at about 430° F.

EXAMPLE VIII

Flour compositions employing the unsaturated compounds of the subject invention are especially useful for preparing dough which is baked into bread.

In this example, flour mixtures are prepared which contain the compositions of this invention.

Preparation of flour additive

About 250 parts of fumaric acid and about 250 parts of monocalcium phosphate are charged to a ball mill and are agitated until at least 99% of the particles pass through a U.S. Standard 100 mesh screen and at least 85% pass through a U.S. Standard 200 mesh screen. After the particle size has been reduced, 100 parts of monoammonium phosphate and 100 parts of tricalcium phosphate are charged to the same ball mill and allowed to agitate until the mixture has a particle size of essentially 100% passing through a U.S. Standard 20 mesh screen and about 96% passing through a U.S. Standard 40 mesh screen and at least 40% passing through a U.S. Standard 200 mesh screen.

Preparation of flour mixture

One thousand parts of flour are charged to a conventional ribbon mixer. To the flour, 12 parts of the flour additive, prepared as above, are added and allowed to mix for one hour to insure a uniform distribution of the additive throughout the flour composition.

A flour mixture produced as above has a reduced mixing requirement and can be used for preparing yeast leavened breakfast rolls having a good taste and color.

Comparable flour mixtures can be produced by replacing the fumaric acid in this example with substantially equal stoichiometric amounts of other fumarate salts or esters thereof.

EXAMPLES IX TO XII

The following bread additives are prepared by admixing the components in the proportions given in a conventional ribbon mixer.

EXAMPLE IX

| Ingredient: | Parts |
|---|---|
| Potassium bromate (60%) | 0.22 |
| Potassium iodate (40%) | |
| Ammonium sulfate | 7.0 |
| Flour | 5.78 |
| Tricalcium phosphate | 17.00 |
| Salt | 20 |
| Monoammonium phosphate | 15 |
| Fumaric acid | 35 |

EXAMPLE X

| Ingredient: | Parts |
|---|---|
| Calcium peroxide | 0.65 |
| Diammonium phosphate | 6 |
| Dicalcium phosphate | 43.35 |
| Calcium fumarate | 30 |
| Sodium chloride | 20 |

EXAMPLE XI

| Ingredient: | Parts |
|---|---|
| Fumaric acid | 10.0 |
| Monoammonium orthophosphate | 6.5 |
| Monocalcium orthophosphate | 28.0 |
| Dicalcium orthophosphate dihydrate | 20.0 |
| Sodium chloride | 35.5 |

EXAMPLE XXI

| Ingredient: | Parts |
|---|---|
| Potassium bromate (60%) | 0.22 |
| Potassium iodate (40%) | |
| Ammonium sulfate | 7.0 |
| Flour | 25.78 |
| Tricalcium phosphate | 17.00 |
| Monoammonium phosphate | 15 |
| Fumaric acid | 35 |

EXAMPLE XIII

| Ingredient: | Parts |
|---|---|
| Calcium peroxide | 0.65 |
| Diammonium phosphate | 6.0 |
| Dicalcium phosphate | 33.35 |
| Calcium fumarate | 50.0 |

All of the yeast food compositions of Examples VIII and IX are useful in either the continuous or conventional processes of producing bread and the yeast food composition of Example XIII is especially useful in the continuous process for producing bread and gives beneficial results when the foregoing yeast food compositions are added in amounts to yield the preferred amounts of yeast food, oxidants, and bread additives in the bread as specified herein.

EXAMPLE XIV

Two bread supplements as set forth below are prepared by admixing the dry ingredients to give a particulate composition.

(A)

| | Percent |
|---|---|
| Fumaric acid | 49.1 |
| Starch | 17.0 |
| Calcium hydroxide | 33.9 |

(B)

| | Percent |
|---|---|
| Fumaric acid | 38.7 |
| Starch | 34.6 |
| Calcium hydroxide | 26.7 |

The procedure as set forth in Example I is followed to determine the peak time and time to breakdown. Supplement (A) is used in an amount of 0.68% by weight and supplement (B) is used in an amount of 0.54% by weight. The results are given in Table 6 below.

TABLE 6

| Supplement | Peak time, minutes | Time to breakdown, minutes |
|---|---|---|
| Control (no supplement) | 15 | 16.7 |
| A | 8.7 | 10.0 |
| B | 8.7 | 9.9 |

From the results shown in the above table, it can be seen that the bread supplements reduce the mixing time significantly.

EXAMPLE XV

The procedure of Example V is followed to determine the effect of bread supplement A and bread supplement B (prepared in Example XIV) on dough and bread in a batch process. Yeast food is used along with the supplements of this invention and supplement A is used in an amount of 0.41% by weight and supplement B is used in an amount of about 0.60% by weight, based on the weight of the flour.

The bread produced utilizing supplements A and B have good loaf volume, grain, texture, softness and aroma and taste qualities.

EXAMPLE XVI

Supplements A and B are used in preparing bread by the continuous process with a 2-stage brew preparation. The same procedure as disclosed in Example VI is followed. The breads prepared by using supplements A and B have excellent grain, texture, crumb color, good volume and taste characteristics and is suitable for commercial sale.

EXAMPLE XVII

Bread is produced by the conventional method according to the procedure described in Example VII. Supplements A and B (prepared in Example XIV) are used. Commercial bread with suitable properties of texture, grain and volume is produced.

What is claimed is:

1. In a method for making yeast leavened bread from wheat flour wherein the bread dough is formed by mixing together bread making ingredients, thereafter the dough is cut, proofed and baked to form bread, the improvement comprising incorporating, prior to mixing, an additive consisting essentially of at least about 0.005 part per 100 parts of wheat flour of fumaric compounds selected from the group consisting of fumaric acid, alkali metal salts of fumaric acid, alkaline earth metal salts of fumaric acid, ammonium fumarate, esters of fumaric acid having 5 to 9 carbon atoms and mixtures of the foregoing to thereby decrease the mixing requirement in the development of bread.

2. A method according to claim 1 wherein said fumaric acid is present in an amount of from about .05 part to about 0.8 part per 100 parts of wheat flour, wherein said salts of fumaric acid are selected from the group consisting of ammonium, potassium, sodium and calcium fumarates, said salts being present in an equivalent molar amount to said acid and wherein said ester is selected from the group consisting of monomethyl fumarate, monoethyl fumarate and monopropyl fumarate, said ester being present in an equivalent molar amount to said acid.

3. A method according to claim 1 wherein said fumaric compound is selected from the group consisting of fumaric acid, the monobasic and dibasic potassium fumarates, monobasic and dibasic ammonium fumarates, monobasic and dibasic sodium fumarates, monobasic and dibasic calcium fumarates, monobasic and dibasic magnesium fumarates, and mixtures of such salts.

4. A method according to claim 3 wherein said fumaric compound is selected from the group consisting of fumaric acid and dibasic calcium fumarate.

5. A bread additive composition consisting essentially of from about 3 to about 50% of an inorganic ammonium salt selected from the group consisting of ammonium salts of hydrochloric acid, ammonium salts of sulfuric acid and ammonium salts of phosphoric acid, and from about 3 to about 50% of a fumaric compound selected from the group consisting of fumaric acid, alakli metal, alkaline earth metal and ammonium salts of fumaric acid, esters of fumaric acid having 5 to 9 carbon atoms and mixtures of the foregoing.

6. A composition according to claim 5 wherein said fumaric compound is selected from the group consisting of fumaric acid, the monobasic and dibasic ammonium fumarates, monobasic and dibasic potassium fumarates, monobasic and dibasic sodium fumarates, monobasic and dibasic calcium fumarates, monobasic and dibasic magnesium fumarates and mixtures of such salts.

7. A composition according to claim 6 wherein said fumaric compound is selected from the group consisting of fumaric acid and dibasic calcium fumarate.

8. A bread additive composition consisting essentially of from about 3 to about 25% by weight of an inorganic ammonium salt selected from the group consisting of ammonium salts of hydrochloric acid, ammonium salts of sulfuric acid, and ammonium salts of phosphoric acid from about 3 to about 35% by weight of a fumaric compound selected from the group consisting of fumaric acid, alkali metal, alkaline earth metal and ammonium salts of fumaric acid, esters of fumaric acid having 5 to 9 carbon atoms and mixtures of the foregoing, from about 0 to about 40% by weight of sodium chloride, from about 0 to about 40% by weight of monocalcium orthophosphate, and from about 0 to about 50% by weight of a flow conditioner selected from the group consisting of flour, starch, calcium phosphate, calcium sulfate, dicalcium orthophosphate and tricalcium orthophosphate.

9. A composition according to claim 8 wherein said fumaric compound is selected from the group consisting of fumaric acid, the monobasic and dibasic ammonium fumarates, monobasic and dibasic potassium fumarates, monobasic and dibasic sodium fumarates, monobasic and dibasic calcium fumarates, monobasic and dibasic magnesium fumarates and mixtures of such salts.

10. A composition according to claim 9 wherein said fumaric compound is selected from the group consisting of fumaric acid and dibasic calcium fumarate.

11. A flour composition consisting essentially of a major proportion of flour and as a mixing improvement agent about 0.005 part per 100 parts of flour of a fumaric compound selected from the group consisting of fumaric acid, alkaline earth metal, alkali metal and ammonium salts of fumaric acid, esters of fumaric acid having 5 to 9 carbon atoms and mixtures of the foregoing.

12. A flour composition according to claim 11 wherein said fumaric acid is present in an amount of from about .05 part to about .5 part per 100 parts of wheat flour wherein said salts of fumaric acid are selected from the group consisting of ammonium potassium, sodium and calcium fumarates, said salts being present in an equivalent molar amount to said acid and wherein said ester is selected from the group consisting of monomethyl fumarate, monoethyl fumarate and monopropyl fumarate.

13. A composition according to claim 11 wherein said fumaric compound is selected from the group consisting of fumaric acid, monobasic and dibasic ammonium fumarates, monobasic and dibasic potassium fumarates, monobasic and dibasic sodium fumarates, monobasic and dibasic calcium fumarates, monobasic and dibasic magnesium fumarates and mixtures of such salts.

14. A composition according to claim 11 wherein said fumaric compound is selected from the group consisting of fumaric acid and dibasic calcium fumarate.

15. A bread supplement comprising (a) fumaric acid in an amount of from about 25% by weight to about 60% by weight based on the total weight of the composition, (b) a base selected from the group consisting of sodium hydroxide, calcium hydroxide, potassium hydroxide and lithium hydroxide, said base being present in an amount of from about 20% by weight to about 40% by weight, based on the total weight of the supplement, and (c) a flow conditioner present in an amount of from about 15% by weight to about 55% by weight.

16. A bread supplement according to claim 15 wherein the fumaric acid is present in an amount of from about 35% by weight to about 45% by weight and the flow conditioner is present in an amount of from about 25% by weight to about 45% by weight, based on the total weight of the bread supplement.

17. A bread supplement according to claim 16 wherein said base is calcium hydroxide and said flow conditioner is starch.

References Cited
UNITED STATES PATENTS

| | | | |
|---|---|---|---|
| 1,151,526 | 8/1915 | Kohman et al. | 99—91 |
| 2,609,298 | 9/1952 | Kirby | 99—91 |

RAYMOND N. JONES, Primary Examiner

J. R. HOFFMAN, Assistant Examiner

U.S. Cl. X.R.

99—91, 93